United States Patent [19]

Vivoli

[11] 3,972,638

[45] Aug. 3, 1976

[54] SYSTEM IN WHICH A NUMBER OF STRUCTURAL MEMBERS ARE USED TO FORM COMPOUND STRUCTURES, PARTICULARLY STRUCTURES FOR FURNISHINGS

[75] Inventor: Marcello Vivoli, Florence, Italy

[73] Assignee: Arte Vetrina s.r.l., Italy

[22] Filed: Feb. 18, 1975

[21] Appl. No.: 550,714

[30] Foreign Application Priority Data

Feb. 15, 1974 Italy.................................. 3337/74

[52] U.S. Cl................................ 403/174; 403/298
[51] Int. Cl.² ........................................ F16D 7/00
[58] Field of Search .......... 403/174, 175, 178, 217, 403/293, 298, 49; 211/182; 52/758 R

[56] References Cited
UNITED STATES PATENTS

| | | | |
|---|---|---|---|
| 3,670,899 | 6/1972 | Kronenberg | 211/182 |
| 3,724,678 | 4/1973 | Challier | 211/182 X |
| 3,747,965 | 7/1973 | Wing | 403/178 X |
| 3,799,685 | 3/1974 | Smith | 403/298 |

*Primary Examiner*—Andrew V. Kundrat
*Attorney, Agent, or Firm*—Robert E. Burns; Emmanuel J. Lobato; Bruce L. Adams

[57] ABSTRACT

Disclosed herein is a system in which a number of structural members are used to form compound structures, particularly structures for furnishings, wherein there is a first connector essentially consisting of a central tubular body with a prismatic or cylindrical surface provided with at least one slot of a given length, open at one end and extending upwards along the median plane on each face of the said surface and of a number of crossed fins protruding from the top and from the bottom of the said central body, the intersection line of the said fins coinciding with the axis of the said central body; a second connector identical to the first, except for the fact that the said central body is sealed at the top by a flat surface; a bar having in the proximity of both of its ends, a slot, open at one end, which fits into one of the said slots in the central body of the connector; a tube of a section identical to that of the central body of the connector; the said fins being designed to slide into the said tube and to attach themselves firmly thereto, so that it be possible to rapidly form structures without the use of locking means and to very quickly vary the arrangement of the structural members used for the formation of any given structure in order to form another structure differing therefrom.

4 Claims, 4 Drawing Figures

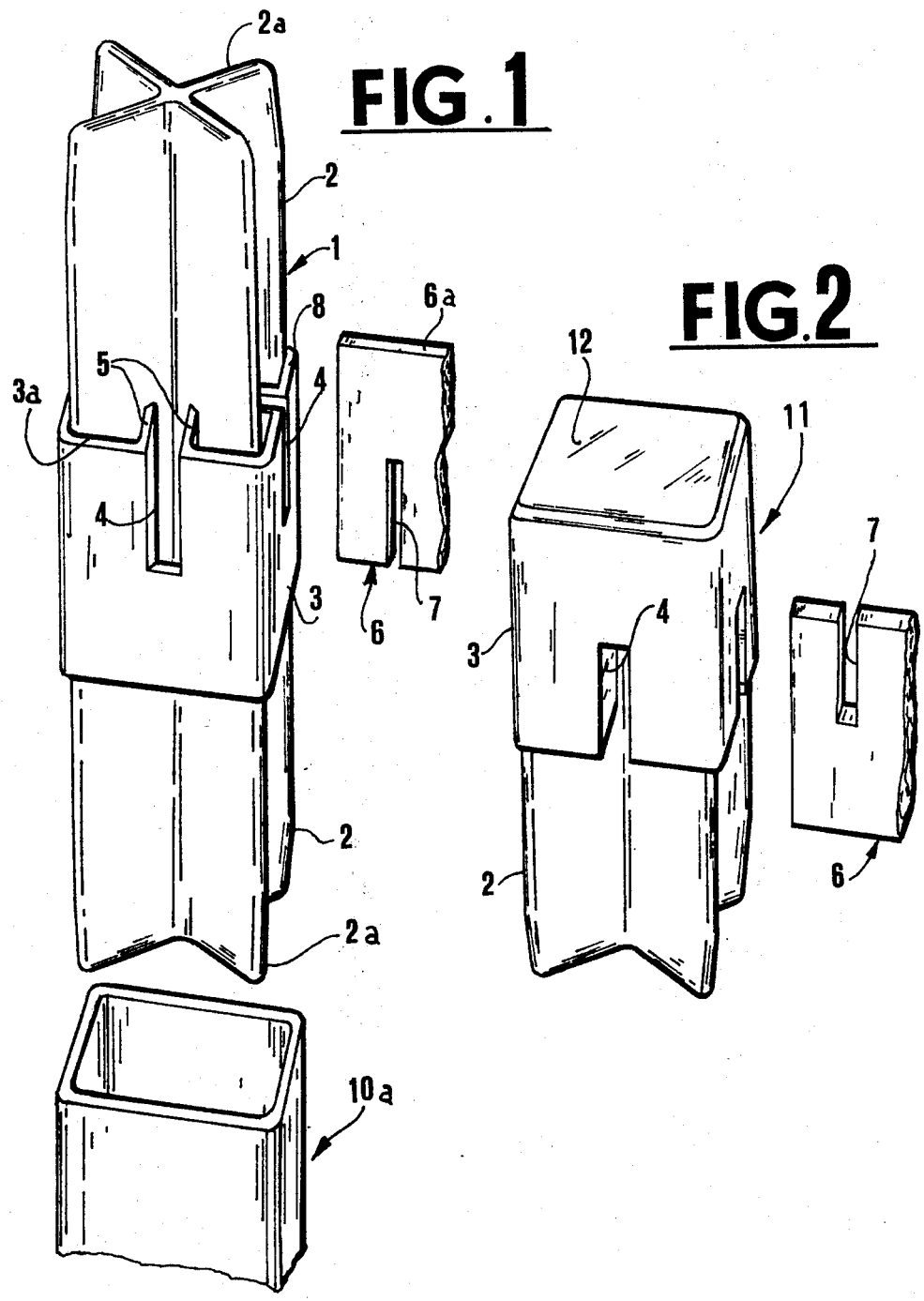

SYSTEM IN WHICH A NUMBER OF STRUCTURAL MEMBERS ARE USED TO FORM COMPOUND STRUCTURES, PARTICULARLY STRUCTURES FOR FURNISHINGS

BACKGROUND OF THE INVENTION

This invention has as its subject a system in which a number of structural members are used to form compound structures, particularly structures for furnishings.

DESCRIPTION OF THE PRIOR ART

For the formation of compound structures, in addition to the well known structures made up of a set of bars held together by tenons or by connecting means such as bolts, nails and the like, compound structures are also known which are constituted by rods having an internal thread at their ends and by threaded pins attached to one single body, the former screwing onto the latter.

In another known compound structure, the struts are in the form of rods which fit into cylindrical bodies, each of which is provided with a number of hollow parts designed to accept the said rods.

With the known structures many problems exist, such as that experienced in putting an internal thread onto the rods and in machining the threaded pins and the housings provided for them. Further difficulties are also caused in providing the tenons with which the bars lock into position in the said cylindrical bodies, in assembling the said structures and because of the precarious stability offered by the union of the rods with the corresponding connecting bodies.

Yet another aspect which is negative is that the presence of the said connecting bodies at the point where the rods are joined breaks their continuity and causes the structure thus formed to be unattractive.

SUMMARY OF THE INVENTION

The object of the present invention is to overcome the aforementioned difficulties by making available a system in which a number of easily made individual parts can be quickly and simply put together to form a compound structure with perfect stability between the various component parts of the said structure.

A further object of the present invention is to make available a system in which a number of parts, when assembled, create a structure which is pleasing in appearance.

The said objects are achieved with a system in which a number of structural members are used to form compound structures, particularly structures for furnishings. The present invention comprises: a first connector essentially consisting of a central tubular body with a prismatic or cylindrical surface provided with at least one slot of a given length, open at one end and extending upwards along the median plane on each face of the said surface and of a number of crossed fins protruding from the top and from the bottom of the said central body, the intersection line of the said fins coinciding with the axis of the said central body; a second connector identical to the first, except for the fact that the said central body is sealed at the top by a flat surface; a bar having in the proximity of both of its ends, a slot, open at one end, which fits into one of the said slots in the central body of the connector; a tube of a section identical to that of the central body of the connector; the said fins being designed to slot into the said tube and to attach themselves firmly thereto.

BRIEF DESCRIPTION OF THE DRAWINGS

Further characteristics and advantages of the invention will emerge more clearly from the following detailed description of a preferred but not the sole form of embodiment for the multiple member system of the present invention, illustrated purely as an unlimited example on the accompanying drawings in which:

FIG. 1 shows, in a perspective view, component parts used in the system which is the subject of the present invention;

FIG. 2 shows, in a perspective view, a connector which also serves as an end piece;

DESCRIPTION OF THE PREFERRED EMBODIMENT

Figure 3:
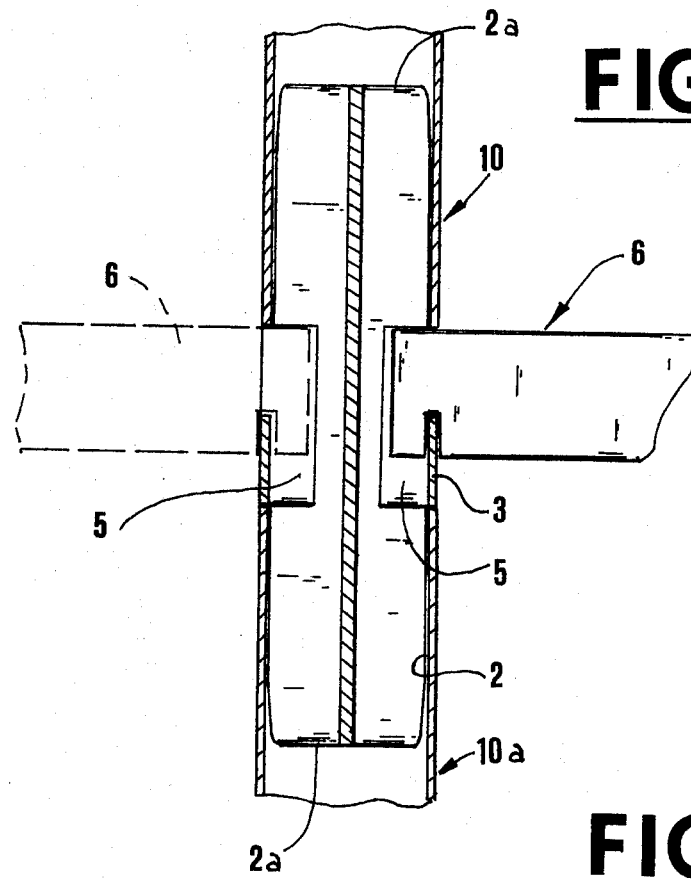
FIG. 3 shows, in longitudinal sectional form, a number of component parts: two bars, two tubes and a connector duly assembled.

With reference to the said figures, at 1 there is a connector formed at the top and bottom by four fins 2 arranged perpendicularly with respect to one another and these form a cross shaped section within a central body 3 generally in the form of a square section tube.

In the median part of each of the four faces which delimitate it, the said central body 3 is provided with a slot 4, open at one end, the thickness of which is exactly the same as that of 3a in the central body 3. The said slot 4 extends vertically, along a median axis, from one end of the said central body 3 for a given depth, is vertically delimitated by two opposite, parallel surfaces which extend upwards through two sides 5 and is so constructed that a flat bar or rail 6 with a corresponding slot 7 can be engaged with it. The said rectangular section flat bar 6 is of a thickness such that only a slight pressure is needed to push it into the said slot 4, the depth of which is established so that when it engages the slot 7, the upper part 8 of the central body 3 and the upper part 6a of the bar 6 are co-planar.

The said bar 6 is prevented from detaching itself by a square section tube of an identical section to that of the said central body 3, when it is put flush against the upper part 8 of the said central body 3.

This position is maintained by the elasticity of the fins 2 inserted into the inside of the tube 10.

The said connector 1 is constructed in such a way that a second tube 10a can receive it at the opposite end to that where the said tube 10 is located and since the said tubes 10 and 10a have perfectly co-planar external surfaces, there is no surface discontinuity when they are positioned against the surfaces of the central body 3.

In order to make it easier to insert the fins 2 into their corresponding tubes, the said fins taper slightly at one end 2a.

A variation of the connector 1 is the connector 11 which is identical to the aforementioned connector 1 except for the fact that its central body 3 is delimitated at the top by a flat surface 12 and thus there are no fins in its upper part. This particular connector, which is used as an end piece, is made to accept one single tube 10 and four flat bars 6.

Figure 4:
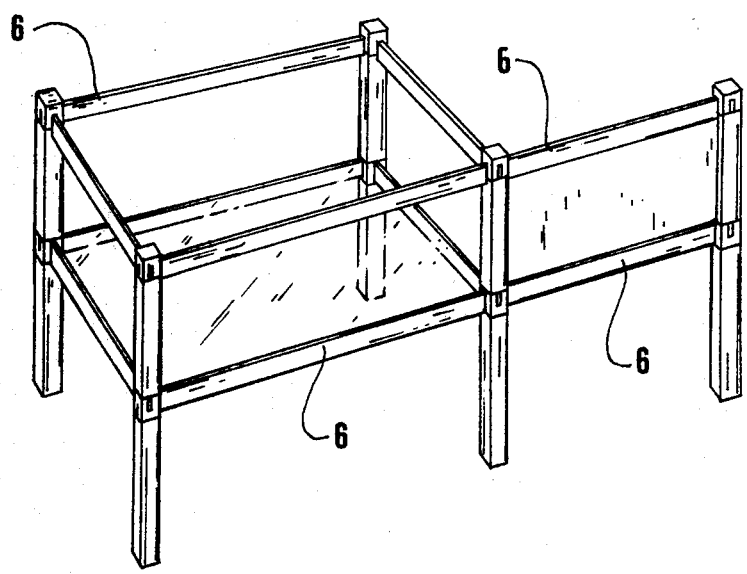
FIG. 4 shows, again in perspective view, one example of an embodiment for a compound structure obtained by assembling a number of the structural members forming the subject of the present invention.

Not only do the said tubes 10 act as reinforcements for the compound structure but they also serve for spacing the said connectors and thus for fixing, in this way, the distance between two superposed bars 6. When a variety of the tubes 10 of identical section but different lengths and a number of bars of various lengths are available, it is possible to create compound structures in which the various dimensions vary considerably, a good example of this being shown in FIG. 4. The said connector 1 constitute stable connection means for the tubes and bars. The latter, in fact, which cannot become detached from the connectors because of the tubes 10, are prevented by the sides 5 in the said slot 4 from undergoing any oscillation movement and because of the fins 2 being pressed by the inner part of the tubes 10, they react flexibly thus preventing the said tubes from working loose.

The advantages offered by the said structural members for the formation of compound structures are that it is quick and easy to assemble them into any structure, irrespective of how it is articulated and, furthermore, that it is also quick and easy to take the said structure apart or to make a dimensional variation thereto.

A further advantage is derived from the perfect stability offered by the structure since the connectors do not allow any movement between the bars and tubes they connect.

Another advantage still lies in the reduced use of labor because of the speed with which the structure may be assembled.

Yet another advantage is that since the distance between two superposed bars and between two adjacent tubes can vary according to the requirements, it can be made to suit the individual exigencies of shops, exhibitions and the home. The structures thus created can be used to display clothes, to hold posters, luminous signs or protective panels, as well as for shelving.

Another advantage, which is important when considering that the said structures are preferably used as furnishings or for display purposes, is that they are nice to look at since the connectors and the tubes do not have any problem of continuity and that provision is made for a connector 11 which serves as an end piece.

Another advantage still is that the connectors 1 and 11 can be produced at a relatively low cost since they can also be moulded out of synthetic resin.

The invention may, in its practical embodiment, differ structurally from what has been stated herein: for example, instead of the section of the central body 3 of the connector being square, it could, for example, be circular in shape; the number of fins 2 could differ from what has been suggested herein, that is to say, four; and the arrangement and shape of the various component parts could vary without this, in any way, deviating from the framework of the following claims.

What is claimed is:

1. In a structure of the type including tubes, rails, and means for connecting tubes and rails, the improvement which comprises: at least one of said means for connecting comprising an axially symmetric central body portion and a plurality of intersecting fins extending axially from said central body portion and having a common line of intersection coaxial with said central body portion, a lateral side of said central body portion having therethrough at least one slot extending parallel to the line of intersection of said fins to an edge defining an end of said central body portion; said rails having slotted end portions for engaging with the slot through the lateral surface of said central body portion; and said tubes having hollow end portions dimensioned to receive and grip the axially extending fins to maintain the fins engaged therewith, and having end portions with lateral surfaces complementary to the lateral surface of said central body portion, whereby the lateral surfaces of a central body portion and a tube in which the axially extending fins of the central body portion have been inserted are flush.

2. In a structure according to claim 1, wherein said plurality of fins extend axially from body ends of said central body portion.

3. In a structure according to claim 1, wherein said plurality of fins extend axially from one end of said central body portion, and an end of said central body portion opposite said one end terminates at a flat surface.

4. In a structure according to claim 1, wherein said central body portion includes a pair of opposed internal walls extending inwardly from the longitudinally extending edges of the slot through the lateral side of the central body portion for a distance greater than the thickness of the lateral side.

* * * * *